United States Patent [19]
Hinkel, Jr.

[11] 3,892,851
[45] July 1, 1975

[54] CLEAR AQUEOUS ANTACID SOLUTION CONTAINING A POLYMERIC MEGLUMINE-HEXITOL-ALUMINUM HYDROXIDE COMPLEX AND PREPARATION THEREOF

[75] Inventor: Emil T. Hinkel, Jr., Bethlehem, N.Y.

[73] Assignee: Sterling Drug Inc., New York, N.Y.

[22] Filed: July 5, 1973

[21] Appl. No.: 376,349

Related U.S. Application Data

[63] Continuation-in-part of Ser. No. 152,963, June 14, 1971, abandoned.

[52] U.S. Cl. .............. 424/157; 424/317; 424/325; 424/343
[51] Int. Cl............................................ A61k 27/00
[58] Field of Search .......... 424/157, 158, 180, 343, 424/325, 317

[56] References Cited
UNITED STATES PATENTS

| | | | |
|---|---|---|---|
| 2,451,772 | 10/1948 | Plunglan ............................ | 424/180 |
| 3,245,876 | 4/1966 | Martin, Jr. .......................... | 424/157 |
| 3,519,712 | 7/1970 | Newmark............................ | 424/180 |
| 3,655,883 | 4/1972 | Granatek et al..................... | 424/157 |
| 3,735,007 | 5/1973 | Lapidus et al. ..................... | 424/158 |

Primary Examiner—Frederick E. Waddell
Attorney, Agent, or Firm—Robert K. Bair; B. Woodrow Wyatt

[57] ABSTRACT

Aqueous antacid solution comprising water and an effective amount of a polymeric meglumine-hexitol-aluminum hydroxide complex having mole ratios of Al:hexitol:meglumine of about 1:at least 0.333:0.12–0.50, preferably 1:0.667–1.333:0.20–0.333, is prepared by reacting aluminum tri(lower-alkoxide) in a non-polar solvent with an aqueous solution of meglumine and hexitol, removing the solvent and lower-alkanol formed by the reaction, and diluting the remaining aqueous solution with water to the desired concentration. A preferred modification having up to about 27 percent by weight of the aluminum hydroxide replaced by magnesium hydroxide is prepared as above by replacing a portion of the aluminum tri-(lower-alkoxide) by magnesium di-(lower-alkoxide) or by magnesium di-aluminum octa-(lower-alkoxide).

20 Claims, No Drawings

CLEAR AQUEOUS ANTACID SOLUTION CONTAINING A PLOYMERIC MEGLUMINE-HEXITOL-ALUMINUM HYDROXIDE COMPLEX AND PREPARATION THEREOF

This application is a continuation-in-part of my co-pending application Ser. No. 152,963, filed June 14, 1971 and now abandoned.

This invention relates to aqueous antacid compositions comprising aluminum hydroxide or aluminum hydroxide-magnesium hydroxide and to their preparation.

Many aqueous antacid and/or ulcer treating compositions comprising aluminum hydroxide have been formulated as suspensions over the past 40 years; also, a number of corresponding preparations comprising the combination of aluminum hydroxide and magnesium hydroxide have been prepared over the past 20 years. These suspensions have the disadvantages of physical unstability, lack of homogeneity, poor palatability and great variation in viscosity.

The composition aspect of the the invention does not have these disadvantages of the said known suspensions and, further, has other advantages, thereby resulting in a unique combination of desirable properties in the novel aqueous antacid solution of the invention.

The invention, in its composition aspect, resides in a clear aqueous solution comprising water and an effective amount, preferably from about 20 to 45 percent by weight per volume, of a polymeric meglumine-hexitol-aluminum hydroxide complex which has mole ratios of Al:hexitol:meglumine of about 1:at least 0.333:0.12–0.50, preferably 1:0.667–1.333:0.20–0.333. A preferred modification of this composition is the solution where up to about 27 percent by weight of the aluminum hydroxide is replaced by magnesium hydroxide. A preferred embodiment is the aqueous antacid solution comprising a polymeric meglumine-hexitol-aluminum hydroxide complex or a polymeric meglumine-hexitol-aluminum hydroxide-magnesium hydroxide complex containing about 4.5 to 9.0 percent of aluminum as aluminum hydroxide, from 0 to about 3.0 percent of magnesium as magnesium hydroxide, about 2.25 to 4.5 percent of meglumine, about 15 to 30 percent of sorbitol, and from 0 to about 7.0 percent of magnesium gluconate, each percentage being as weight per volume; a particularly preferred embodiment is said solution containing upper limits of about 6.0 percent of aluminum as aluminum hydroxide, about 1.5 percent of magnesium as magnesium hydroxide, about 3.0 percent of meglumine, about 20 percent of sorbitol, and, optionally, about 3.5 percent of magnesium gluconate. Other solutions within the scope of the invention can contain as low as about 12 percent (as weight per volume) of said complex, either with or without magnesium as magnesium hydroxide, were obtained by diluting the aforesaid solutions with distilled water.

The aqueous antacid solution of the invention has the following unique combination of properties as determined by standard test procedures, presented hereinbelow: the solution is clear; it is palatable without the chalkiness and astringency of the conventional suspensions; its acid neutralizing capacity, at equal dosages, is equal to or superior to that of conventional commercial suspensions; its rapid speed of acid neutralization likewise equals or surpasses that of the conventional aluminum hydroxide or aluminum-magnesium hydroxide suspensions; it gives greater protection against stomach ulceration in animal tests than the conventional suspensions; it is indicated by animal tests to have a greater coating action on the stomach mucosa than the conventional suspensions; it is practically free of sodium ion, which is undesirable to patients with heart or kidney aliments, one teaspoon containing only 0.25 mg. of sodium compared to 2.5 mg. and more in the leading commercial suspensions; and, it is carbonate free in contrast with conventional suspension antacids which contain residual carbonate due to manufacturing procedures.

The invention, in its process aspect, resides in the process for preparing a clear aqueous antacid solution comprising water and an effective amount, from about 12 to 45 percent and preferably from about 20 to 45 percent by weight per volume, of a polymeric meglumine-hexitol-aluminum hydroxide complex which has mole ratios of Al:hexitol:meglumine of about 1:at least 0.333:0.12–0.50, preferably 1:0.667–1.333:0.20–0.333, which comprises mixing aluminum tri-(lower-alkoxide) in a non-polar solvent with an aqueous solution of meglumine and hexitol, separating the aqueous phase from the non-polar phase of the mixture, heating the aqueous phase under reduced pressure to remove residual non-polar solvent and the lower-alkanol produced in the mixture, and diluting the remaining aqueous solution with water to the desired concentration. A preferred modification of this process is the preparation of said aqueous antacid solution where up to about 27 percent by weight of the aluminum hydroxide is replaced by magnesium hydroxide wherein the process is modified by replacing a portion of the aluminum tri-(lower-alkoxide) with magnesium di-(lower-alkoxide) or by magnesium di-aluminum octa-(lower-alkoxide). Because of their ease of preparation and lower cost, preferred lower-alkoxides are the isopropoxides and n-propoxides, and, for the same reasons, the preferred hexitols are sorbitol and mannitol.

As used herein, the term "lower-alkoxide" means alkoxide moieties having from two to five carbon atoms inclusive and being straight or branched chained, among which are, for purposes of illustration but without limiting the generality of the foregoing, ethoxide, n-propoxide, isopropoxide, n-butoxide, isobutoxide, 2-butoxide and n-amoxide.

The manner and process of making and using the invention will now be generally described so as to enable a person skilled in the art of pharmaceutical chemistry to make and use the same, as follows:

The essential ingredients used to prepare the aqueous antacid solution of the invention are known compounds, for example, meglumine is N-methylglucamine, also known as 1-deoxy-1-methylamino-D-glucitol or N-methyl-D-glucamine. As illustrative of hexitol, sorbitol, which is conveniently employed as an aqueous solution (e.g., 70 percent), is also known as D-sorbitol, sorbit, sorbol, or D-glucitol and mannitol is also known as D-mannitol, mannite or manna sugar. The aluminum tri-(lower-alkoxides), magnesium di-(lower-alkoxides) and magnesium di-aluminum octa-(lower-alkoxides) are known compounds prepared by conventional methods.

The aqueous antacid solution of the invention also can include one or more sweetening agents, e.g., saccharin, etc.; one or more flavoring agents, e.g., peppermint, etc.; and, one or more preservatives, e.g., methyl or propyl 4-hydroxybenzoate, etc. The use of sweetening, flavoring and preserving agents is conventional and forms no part of the instant invention, and it is contemplated that any such compatible agents can be used.

The process aspect of the invention is carried out conveniently by mixing, preferably with stirring, a solution of aluminum tri-(lower-alkoxide), preferably aluminum isopropoxide or aluminum n-propoxide, in a non-polar solvent, for example, benzene, cyclohexane, and the like, with an aqueous solution containing the hexitol, preferably sorbitol or mannitol, meglumine and water. The reaction mixture is mixed well and allowed to stand until the non-polar and aqueous phases separate. The aqueous phase is separated from the non-polar layer, e.g., by decantation of the latter, and washed with a non-polar solvent, e.g., benzene or cyclohexane, the washings being discarded. The aqueous phase is then heated in vacuo at about 40° to 70°C., preferably about 50° to 60°C., to remove the non-polar solvent and the lower-alkanol produced by the reaction, e.g., isopropyl alcohol when using aluminum isopropoxide or n-propanol when using aluminum n-propoxide. The remaining aqueous solution is diluted to the desired concentration with distilled water. The resulting cloudy aqueous solution becomes clear on standing at room temperature (about 22°–26°C.). The pH of the solution ranges from about 8.5 to 9.8. The aqueous solution of the invention containing up to about 27 percent by weight of the aluminum hydroxide replaced by magnesium hydroxide is prepared as above by replacing the calculated proportion of the aluminum tri-(lower-alkoxide) with magnesium di-(lower-alkoxide) or magnesium di-aluminum octa-(lower-alkoxide), preferably magnesium isopropoxide or n-propoxide, or magnesium di-aluminum octa-(isopropoxide) or octa-(n-propoxide).

Optionally, the magnesium content of the solution containing the polymeric meglumine-hexitol-aluminum hydroxide-magnesium hydroxide complex can be increased by the addition of a suitable water soluble magnesium salt; e.g., magnesium gluconate, magnesium tartrate, and the like.

The total acid neutralizing power (ANP) of the aqueous antacid solution of the invention was determined as follows:

Transfer 1.0 ml. ("to contain" pipet) of the solution to a 100 ml. volumetric flask. Add 50 ml. of water to the flask, using portions of the water to rinse the pipet. Add 10.0 ml. of 1N hydrochloric acid and mix. Heat at 37°C. for 1 hour, shaking frequently. Cool to room temperature, dilute to volume (100 ml.) with water, and mix. Titrate 25.0 ml. potentiometrically to pH 3.5 with 0.1N sodium hydroxide. The total acid neutralizing power (ANP) is calculated as follows: 100—(4×ml. 0.1N sodium hydroxide)=ml. 0.1N hydrochloric acid neutralized per milliliter of sample.

The rate of acid neutralization (RAN) of the aqueous antacid solution of the invention was determined as follows:

Prepare a glass constant temperature cell at 37°C. and provide with electrodes and stirrer. Add 40 ml. of water and, optionally, 10 drops of a wetting agent, e.g., Triton X-100 or iso-octyl phenoxy polyethoxy ethanol. Bring to 37°C. and add 3.0 ml. ("to contain" pipet) of the antacid solution, using 10 ml. of water in several portions to rinse the pipet. Allow mixture to stir until thoroughly mixed and bring to 37+C. Turn on pH meter, start time and add 0.1N hydrochloric acid continuously at such a rate as to maintain a pH of 3.5. Record the volume of acid consumed during each 2½ minute interval up to 15 minutes, and, if desired, during each 5 minute interval up to 30 minutes. When acid volume is plotted against time a smooth curve results.

The following examples will illustrate specific embodiments of the invention without, however, limiting it thereto.

EXAMPLE 1

An aqueous antacid solution comprising polymeric meglumine-sorbitol-aluminum hydroxide complex having mole ratios of Al:sorbitol:meglumine of 1:1.33:0.20 was prepared as follows: To a well mixed solution containing 693.4 g. of 70 percent sorbitol solution (aqueous), 200 ml. of 2M meglumine solution (aqueous) and 260 ml. of distilled water at room temperature (about 23°–25°C.) was added slowly with rapid stirring 2000 ml. of a solution containing 408 g. of aluminum isopropoxide in benzene also at room temperature. Stirring was continued for 30 minutes after all of the aluminum isopropoxide solution had been added. The solution was allowed to stand for about 1 hour and the layers were separated by decanting the benzene layer. The aqueous layer was extracted with two 500 ml. portions of benzene and the benzene extracts discarded. The aqueous phase was then heated in vacuo to remove any remaining benzene and the isopropyl alcohol formed by the reaction. The remaining aqueous preparation was diluted with distilled water to yield 2600 g. of a cloudy aqueous solution. On standing for about two weeks at room temperature, the solution became clear. The pH of the solution was 9.0 and its density was 1.111. The quantity of the polymeric meglumine-sorbitol-aluminum hydroxide complex in the solution is calculated as equivalent to 6 percent aluminum hydroxide, 18.6 percent sorbitol and 3.0 percent meglumine; analysis showed the solution to contain 6.00 percent aluminum hydroxide, 18.4 percent sorbitol and 3.19 percent meglumine. The amount of sodium found was 0.00055 percent. The total acid neutralizing power (ANP) of this solution after standing for one month at room temperature (r.t. : about 23°–25°C.) was found to be 25.6 ml. of 0.1N HCl/ml. Its rate of acid neutralization (RAN) after standing at room temperature for 23 and 75 days was found to be as follows:

| | RAN, 1 ml. at 0.1N HCl per 3.0 ml. at minutes | | | | | | | | |
|---|---|---|---|---|---|---|---|---|---|
| | 2.5 | 5.0 | 7.5 | 10.0 | 12.5 | 15.0 | 20.0 | 25.0 | 30.0 |
| 23 days, r.t. | 19.8 | 27.6 | 32.7 | 37.2 | 39.8 | 42.4 | 46.6 | 49.9 | 52.1 |
| 75 days, r.t. | 16.5 | 21.8 | 27.7 | 29.0 | 31.7 | 33.8 | 37.8 | 40.8 | 43.0 |

EXAMPLE 2

An aqueous antacid solution comprising polymeric meglumine-sorbitol-aluminum hydroxide-magnesium hydroxide complex having mole ratios of Al:Mg:sorbitol:meglumine of 1:0.45:1.50:0.20 was prepared as follows: A 2.816 kg. portion of 70 percent sorbitol solution and 282 g. of meglumine were dissolved in 4.05 liters of distilled water contained in a suitable vessel preferably having a capacity of about 20 percent greater than the batch size. To the sorbitol-meglumine solution was added with vigorous stirring 7.216 liters of 1.0M Al 0.45M Mg isopropoxide solution in cyclohexane (preparation given below), the stirring being sufficiently vigorous so as to maintain an intimate mixture of the aqueous and cyclohexane phases. Vigorous stirring was continued for 30 to 60 minutes after addition of the isopropoxide solution. Stirring was then stopped and the reaction mixture was allowed to stand until the cyclohexane and aqueous phases separated. The cyclohexane phase was then removed by decantation. The aqueous phase was extracted with 1500 ml. of fresh cyclohexane and vigorously mixed for five to ten minutes. The mixture was allowed to separate and the cyclohexane phase removed by decantation. The cyclohexane extraction procedure was repeated twice and then sufficient distilled water was slowly added with efficient stirring to the aqueous phase to bring the batch to 75–100 percent of the final volume. The residual cyclohexane and by-product isopropyl alcohol were removed by distillation under reduced pressure, heating the reaction vessel in a water bath of about 50°–60°C. The remaining aqueous preparation was diluted with distilled water to yield 12.5 liters of the desired aqueous solution. The pH of the solution was 9.5 and its specific gravity at 25°C. was 1.096. Each teaspoon (5 ml.) of this solution contains:

|  | Calculated wt., mg. | % (wt./vol.) | Found % (wt./vol.) |
|---|---|---|---|
| Al as Al(OH)$_3$ | 225 | 4.5 | 4.65 |
| Mg as Mg(OH)$_2$ | 75 | 1.5 | 1.55 |
| sorbitol | 790 | 15.8 | 15.7 |
| meglumine | 113 | 2.25 | 2.13 |

The rate of acid neutralization (RAN) of this solution after three weeks at room temperature (r.t., i.e., 23°–25°C., as used here and hereinafter) is given as follows:

| | RAN, 1 ml. 0.1N HCl per 3.0 ml. at ___ minutes | | | | | |
|---|---|---|---|---|---|---|
| | 2.5 | 5.0 | 7.5 | 10.0 | 12.5 | 15.0 |
| 3 wks., r.t. | 57.4 | 61.6 | 63.0 | 63.8 | 64.1 | 64.6 |

The above 1.0M Al 0.45Mg isopropoxide solution in cyclohexane was prepared as follows: A 7.119 kg. portion of magnesium aluminum isopropoxide was dissolved in cyclohexane and to the solution was added cyclohexane to bring the total volume to 11 liters, thereby yielding a solution which assayed as 2.1M Al 0.94M Mg isopropoxide. Dilution of 3436 ml. of this 2.1M Al 0.94M Mg isopropoxide solution with 3780 ml. of cyclohexane yielded 7.216 liters of the 1.0M Al 0.45M Mg isopropoxide solution.

EXAMPLE 3

An aqueous antacid solution comprising polymeric meglumine-sorbitol-aluminum hydroxide-magnesium hydroxide complex having mole ratios of Al:Mg:sorbitol:meglumine of 1:0.30:1.50:0.20 and also having 0.15 mole of magnesium gluconate per mole of Al was prepared following the procedure described in Example 2 with the following variations: 7.214 liters of a 1.0M Al 0.3M Mg isopropoxide solution in cyclohexane (prepared by mixing magnesium aluminum isopropoxide solution, aluminum isopropoxide solution and cyclohexane) was added to the sorbitol-meglumine aqueous solution and after extracting the reaction mixture three times with cyclohexane, a 450 g. portion of magnesium gluconate dissolved in about 1.5 liters of warm (40°–50°C.) distilled water was added to the aqueous phase of the reaction mixture. Sufficient distilled water was added to the stirred mixture to bring the batch to approximately 75 percent of the final volume. The residual cyclohexane and by-product isopropyl alcohol was distilled off under reduced pressure as in Example 2 and the remaining aqueous preparation was diluted with distilled water to yield 12.5 liters of the desired aqueous solution. Each teaspoon (5ml.) of the solution contains:

|  | Calculated wt., mg. | % (wt./vol.) | Found % (wt./vol.) |
|---|---|---|---|
| Al as Al(OH)$_3$ | 225 | 4.5 | 4.33 |
| total Mg as Mg(OH)$_2$ | 75 | 1.5 | 1.49 |
| sorbitol | 790 | 15.8 | a |
| meglumine | 113 | 2.25 | a |
| gluconic acid | 170 | 3.40 | a | a. Refer to analysis of Example 29 which is the same as Example 3.

The pH of the solution was 9.13.

The total acid neutralizing power (ANP) and rate of acid neutralization (RAN) of this solution after 1 week and 4 months at room temperature and after 1 additional month at 5°, 25° and 50°C. are given as follows:

| | pH | Total ANP ml. 0.1N HCl/ml. | RAN, 1 ml. 0.1N HCl per 3.0 ml. at ___ minutes | | | | | |
|---|---|---|---|---|---|---|---|---|
| | | | 2.5 | 5.0 | 7.5 | 10.0 | 12.5 | 15.0 |
| 1 wk., r.t. | 9.13 | — | 46.7 | 49.0 | 49.6 | 50.6 | 50.7 | — |
| 4 mos., r.t. | 9.0 | 23.2 | 34.2 | 37.6 | 38.4 | 39.6 | 40.2 | 40.6 |
| +1 mo., 5°C. | 9.2 | — | 39.0 | 44.0 | 46.6 | 47.8 | 48.8 | 49.2 |
| +1 mo., 25°C. | 9.2 | — | 39.8 | 45.0 | 47.0 | 48.0 | 49.0 | 49.6 |
| +1 mo., 50°C. | 9.2 | — | 27.8 | 35.8 | 39.4 | 41.8 | 43.2 | 44.0 |

EXAMPLE 4

An aqueous antacid solution comprising polymeric meglumine-sorbitol-aluminum hydroxide complex having mole ratios of Al:sorbitol:meglumine of 1:1.333:0.20 was prepared using aluminum ethoxide as follows: To a well stirred solution containing 17.33 g. of 70 percent sorbitol, 5.0 ml. of 2 M meglumine and 10 ml. of water was added 43.1 ml. of a 1.16 M solution of aluminum ethoxide in benzene. Stirring was continued for approximately 20 minutes after addition of the alkoxide. Stirring was stopped and the mixture was allowed to separate. The solvent later was decanted and the aqueous phase was transferred to a tared 250 ml. round bottom flask using 50–75 ml. of water. The residual benzene and the by-product ethanol were distilled off under reduced pressure. The remaining thick syrupy residue was diluted to a volume of 65.0 g. net with distilled water to yield a cloudy solution which gradually cleared up while standing at room temperature over a period of about 2 weeks.

EXAMPLE 5

An aqueous antacid solution comprising polymeric meglumine-sorbitol-aluminum hydroxide complex having mole ratios of Al:sorbitol:meglumine of 1:1.333:0.40 was prepared according to the procedure described in Example 4 but using 10.0 ml. of 2 M meglumine solution and 5.0 ml. of water. The resulting solution was practically clear when made, having only a slight haze which cleared up on standing about a week.

EXAMPLE 6

An aqueous antacid solution comprising polymeric meglumine-sorbitol-aluminum hydroxide complex having mole ratios of Al:sorbitol:meglumine of 1:1.333:0.20 was prepared as in Example 4 but using 53.5 ml. of a 0.935 M solution of aluminum 2-butoxide in cyclohexane. The final solution was cloudy, but cleared while standing at room temperature over a 2 week period.

EXAMPLE 7

An aqueous antacid solution comprising polymeric meglumine-sorbitol-aluminum hydroxide complex having mole ratios of Al:sorbitol:meglumine of 1:1.333:0.40 was prepared using aluminum 2-butoxide following the procedure described in Example 6 but using 10.0 ml. of 2 M meglumine solution and 5 ml. of water. The resulting solution was clear when made.

Example 8

An aqueous antacid solution comprising polymeric meglumine-sorbitol-aluminum hydroxide complex having mole ratios of Al:sorbitol:meglumine of 1:1.333:0.20 using aluminum tert.-butoxide was prepared as in Example 4 but using 53.5 ml. of 0.935 M solution of aluminum tert.-butoxide in cyclohexane. The final solution was hazy but cleared on standing several days at room temperature.

EXAMPLE 9

An aqueous antacid solution comprising polymeric meglumine-sorbitol-aluminum hydroxide complex having mole ratios of Al:sorbitol:meglumine of 1:1.333:0.40 was prepared following the procedure described in Example 8 but using 10 ml. of 2 M meglumine solution. The resulting solution was practically clear when made, having only a very slight haze which cleared up on standing 3 days at room temperature.

The rates of acid neutralization (RAN) of the solutions of Example 1 and Examples 4–9 inclusive after 15 days at room temperature are given as follows:

| Example | RAN, 1 ml. 0.1N HCl per 3.0 ml. at minutes | | | | | |
|---|---|---|---|---|---|---|
| | 2.5 | 5.0 | 7.5 | 10.0 | 12.5 | 15.0 |
| 4[a] | 22.2 | 29.8 | 35.7 | 40.2 | 43.5 | 46.1 |
| 6[a] | 22.7 | 31.3 | 37.7 | 42.4 | 46.3 | 48.7 |
| 8[a] | 24.7 | 35.3 | 41.5 | 45.8 | 49.2 | 51.4 |
| 1[a] | 22.4 | 31.0 | 36.7 | 40.9 | 43.7 | 46.2 |
| 5[b] | 32.0 | 31.0 | 43.9 | 47.3 | 49.4 | 51.5 |
| 7[b] | 32.4 | 40.4 | 45.4 | 49.3 | 52.2 | 54.3 |
| 9[b] | 32.0 | 39.8 | 45.4 | 48.8 | 51.8 | 53.9 |

[a] Al:meglumine ratio of 1:0.2.
[b] Al:meglumine ratio of 1:0.4.

EXAMPLE 10

A solution like that of Example 1 was prepared using cyclohexane instead of benzene as a solvent and the following ingredients per 1500 ml. of solution: 1154 ml. of 1 M aluminum isopropoxide in cyclohexane, 400 g. of 70 percent sorbitol solution, 45 g. of meglumine and 220 ml. of distilled water. After removal in vacuo of the residual cyclohexane and isopropyl alcohol, the remaining material was diluted to 1500 ml (1644 g.) with distilled water to yield a solution of polymeric meglumine-sorbitol-aluminum hydroxide complex having mole ratios of Al:sorbitol:meglumine of 1:1.333:0.20.

| Analysis (wt./vol.): | % Calcd. | % Found |
|---|---|---|
| Al as Al(OH)$_3$ | 6.0 | 5.52 |
| sorbitol | 18.7 | 19.3 |
| meglumine | 3.0 | 3.01 |

The total acid neutralizing power (ANP) and rate of acid neutralization (RAN) of this solution after 1 month at room temperature are given as follows:

| | Total ANP ml. 0.1N HCl/ml. | RAN, 1 ml. 0.1N HCl per 3.0 ml. at minutes | | | | | | |
|---|---|---|---|---|---|---|---|---|
| | | 2.5 | 5.0 | 7.5 | 10.0 | 12.5 | 15.0 | 20.0 | 30.0 |
| 1 mo., r.t. | 24.4 | 15.4 | 20.4 | 24.2 | 27.2 | 29.6 | 31.4 | 34.6 | 39.0 |

EXAMPLE 11

A solution like that of Example 2 was prepared using the following ingredients per 1500 ml. of solution: 410.2 ml. of 2.05M Al 0.95M Mg isopropoxide solution in cyclohexane, 25.1 ml. of 1 M aluminum isopropoxide in cyclohexane, 430.7 ml. of cyclohexane, 338 g. of 70 percent sorbitol solution, 33.8 g. of meglumine and 486 ml. of water. After removing the residual cyclohexane and isopropyl alcohol by distillation in vacuo, the remaining solution was diluted to 1500 ml. (1643 g.) with distilled water to yield a solution of polymeric meglumine-sorbitol-aluminum hydroxide-magnesium hydroxide complex having mole ratios of Al:Mg:sorbitol:meglumine of 1:0.45:1.50:0.20.

| Analysis (wt./vol.): | % Calcd. | % Found |
|---|---|---|
| Al as Al(OH)₃ | 4.5 | 4.34 |
| Mg as Mg(OH)₂ | 1.5 | 1.33 |
| sorbitol | 15.8 | 16.5 |
| meglumine | 2.25 | 2.25 |

The total acid neutralizing power (ANP) and rate of acid neutralization (RAN) of this solution after 3 weeks at room temperature and after additional storage in 5 ml. ampoules for various times and temperatures are given as follows:

| | Total ANP ml. 0.1N HCl/ml. | RAN, 1 ml. 0.1N HCl per 3.0 ml. at ___ minutes | | | | | | |
|---|---|---|---|---|---|---|---|---|
| | | 2.5 | 5.0 | 7.5 | 10.0 | 12.5 | 15.0 | 20.0 | 30.0 |
| 3 wks., r.t. | 26.0 | 52.4 | 60.0 | 62.4 | 63.4 | 64.2 | 65.0 | 66.0 | 67.2 |
| 4 wks., 90°C. | — | 23.0 | 30.9 | 37.3 | 39.3 | 40.8 | 42.0 | 43.5 | 44.9 |
| 8 wks., 50°C. | — | 40.3 | 49.8 | 54.5 | 57.0 | 58.4 | 59.4 | — | — |
| 3 mos., 25°C. | — | 54.2 | 60.2 | 62.4 | 63.7 | 64.5 | 65.1 | — | — |

The above 2.05M Al 0.95M Mg isopropoxide solution in cyclohexane was prepared by dissolving 2.36 kg. of magnesium aluminum isopropoxide (9.14 percent Al and 3.74 percent Mg by assay) in cyclohexane and then adding cyclohexane to achieve total volume of 4.0 liters. The solution was assayed for Al and Mg and found to contain 2.05M Al and 0.95M Mg.

EXAMPLE 12

A solution like that of Example 2 was prepared using the following ingredients per 650 g. (595 ml.) of solution: 500 ml. of 0.5 M magnesium dialuminum octaisopropoxide in benzene, 173.35 g. of 70 percent sorbitol solution, 50 ml. of 2 M meglumine solution and 80 ml. of distilled water. After distilling off in vacuo the residual benzene and isopropyl alcohol, the remaining material was diluted with distilled water to yield 650 g. of solution. A 225 g. portion of this solution was diluted with 75 g. of distilled water and tested for RAN as follows:

| | pH | RAN, 1 ml. 0.1N HCl per 3.0 ml. at ___ minutes | | | | | |
|---|---|---|---|---|---|---|---|
| | | 2.5 | 5.0 | 7.5 | 10.0 | 12.5 | 15.0 |
| 7 ds., r.t. | — | 62.0 | 65.8 | 67.0 | — | — | — |
| 9 ds., r.t. | 9.23 | 61.6 | 64.9 | 65.9 | 66.5 | 66.9 | 67.1 |
| 125 ds., r.t. | 9.65 | 58.3 | 63.9 | 66.0 | 66.8 | 67.3 | 67.4 |
| 128 ds., r.t. | 9.68 | 57.4 | 63.4 | 65.2 | 66.3 | 67.2 | 67.6 |

EXAMPLE 13

A solution like that of Example 3 was prepared using the following ingredients per 1500 ml. of solution: 305.3 ml. of 1M Al isopropoxide in cyclohexane, 273.5 ml. of 2.05M Al 0.95M Mg isopropoxide solution in cyclohexane, 287 ml. of cyclohexane, 338 g. of 70 percent sorbitol solution, 33.8 g. of meglumine, 53.9 g. of magnesium gluconate and 260 ml. of distilled water. After removal of the residual cyclohexane and isopropyl alcohol, the remaining solution was diluted to 1500 ml. (1650 g.) with distilled water to yield a solution (pH of 9.30) of polymeric meglumine-sorbitol-aluminum hydroxide-magnesium hydroxide complex having mole ratios of Al:Mg::sorbitol:meglumine of 1:0.30:1.50:0.20 and also 0.15 mole of magnesium gluconate per mole of Al.

| Analysis (wt./vol.): | % Calcd. | % Found |
|---|---|---|
| Al as Al(OH)₃ | 4.5 | 4.31 |
| Mg as Mg(OH)₂ | 1.5 | 1.36 |
| meglumine | 2.25 | 2.17 |
| sorbitol + gluconic acid | 15.8 + 3.4 | 18.1" |

"sorbitol + gluconic acid; see Example 29 for analysis of each.

The total ANP and RAN of this solution after 3 weeks at room temperature and additional storage in 5 ml. ampoules for various times and temperatures are given as follows:

| | Total ANP ml. 0.1N HCl/ml. | RAN, 1 ml. 0.1N HCl per 3.0 ml. at ___ minutes | | | | | | |
|---|---|---|---|---|---|---|---|---|
| | | 2.5 | 5.0 | 7.5 | 10.0 | 12.5 | 15.0 | 20.0 | 30.0 |
| 3 wks., r.t. | 24.4 | 40.2 | 46.0 | 46.4 | 46.8 | 47.2 | 48.2 | 48.6 | 49.6 |
| + 1 wk., 90°C. | — | 13.6 | 18.9 | 23.2 | 26.0 | 28.3 | 30.3 | 33.0 | 36.0 |
| + 4 wks., 50°C. | — | 27.0 | 35.0 | 38.8 | 41.1 | 42.2 | 43.3 | 44.3 | 45.8 |
| + 4 wks., 70°C. | — | 13.2 | 18.2 | 22.5 | 26.0 | 28.3 | 30.4 | 33.1 | 36.5 |
| + 8 wks., 50°C. | — | 22.8 | 31.2 | 36.1 | 38.3 | 39.9 | 41.1 | 43.0 | — |
| + 3 mos., 25°C. | — | 40.4 | 44.8 | 46.7 | 47.5 | 48.1 | 49.0 | 50.0 | — |

EXAMPLE 14

A solution like that of Example 1 was prepared as in Example 1 using mannitol in place of sorbitol and the following ingredients per 130 g. of solution: 100 ml. of 1M aluminum isopropoxide in benzene, 24.27 g. of mannitol, 10.0 ml. of 2M meglumine solution and 23 ml. of water. After removal of the benzene and isopropyl alcohol, the remaining material was diluted with distilled water to yield 130 g. of solution comprising polymeric meglumine-mannitol-aluminum hydroxide complex having mole ratios of Al:mannitol:meglumine of 1:1.333:0.20. Its RAN after 82 days at room temperature was found to be as follows:

| | pH | 2.5 | 5.0 | 7.5 | 10.0 | 12.5 | 15.0 | 20.0 | 25.0 | 30.0 |
|---|---|---|---|---|---|---|---|---|---|---|
| | | | | | RAN, 1 ml. 0.1N HCl per 3.0 ml. at ___ minutes | | | | | |
| 82 ds., r.t. | 8.85 | 18.6 | 24.4 | 28.7 | 31.9 | 34.7 | 36.8 | 39.8 | 42.4 | 44.8 |

The aqueous antacid solutions of Examples 15 through 24, each of which comprises the polymeric meglumine-sorbitol-aluminum hydroxide complex having the indicated mole ratios of Al:sorbitol:meglumine, were prepared by following the procedure described in Example 1 but using the appropriate quantities of ingredients as indicated.

EXAMPLE 15

Aqueous antacid solution (pH 9.31) having mole ratios of Al:sorbitol:meglumine of 1:0.667:0.333 was prepared as in Example 1 using 8.66 g. of 70 percent sorbitol solution, 8.33 ml. of 2M meglumine solution, 12.0 ml. of distilled water and 50.0 ml. of 1M aluminum isopropoxide in benzene, and diluting with distilled water to a total weight of 65 g. after removal of the benzene and isopropyl alcohol in vacuo. The RAN values of this solution after 9 and 65 days at room temperature were found to be as follows:

| | pH | 2.5 | 5.0 | 7.5 | 10.0 | 12.5 | 15.0 | 20.0 | 25.0 | 30.0 |
|---|---|---|---|---|---|---|---|---|---|---|
| | | | | | RAN, 1 ml. 0.1N HCl per 3.0 ml. at ___ minutes | | | | | |
| 9 ds., r.t. | 9.0 | 32.6 | 41.0 | 46.1 | 50.1 | 52.0 | 53.8 | 57.3 | 59.2 | 60.6 |
| 65 ds., r.t. | 9.0 | 25.6 | 31.4 | 36.8 | 39.4 | 41.8 | 44.1 | 47.5 | 49.8 | 51.8 |

EXAMPLE 16

Aqueous antacid solution (pH 9.15) having mole ratios of Al:sorbitol:meglumine of 1:0.667:0.25 was prepared as in Example 1 using 8.66 g. of 70 percent sorbitol solution, 6.25 ml. of 2M meglumine solution, 14.0 ml. of distilled water and 50.0 ml. of 1M aluminum isopropoxide solution in benzene, and diluting with distilled water to a total weight of 65 g. as in Example 15. The RAN values of this solution after 9 and 65 days at room temperature were found to be as follows:

| | pH | 2.5 | 5.0 | 7.5 | 10.0 | 12.5 | 15.0 | 20.0 | 25.0 | 30.0 |
|---|---|---|---|---|---|---|---|---|---|---|
| | | | | | RAN, 1 ml. 0.1N HCl per 3.0 ml. at ___ minutes | | | | | |
| 9 ds., r.t. | 9.1 | 29.7 | 39.2 | 43.6 | 46.9 | 49.2 | 51.2 | 53.5 | 56.0 | 57.6 |
| 65 ds., r.t. | 8.8 | 21.5 | 27.7 | 32.0 | 35.8 | 38.2 | 40.6 | 44.1 | 46.8 | 49.1 |

EXAMPLE 17

Aqueous antacid solution (pH 9.0) having mole ratios of Al:sorbitol:meglumine of 1:0.667:0.20 was prepared as in Example 1 using 8.66 g. of 70 percent sorbitol solution, 5.0 ml. of 2M meglumine solution, 15.0 ml. of distilled water and 50.0 ml. of 1M aluminum isopropoxide solution in benzene, and diluting with distilled water to a total weight of 65 g. as in Example 15. The RAN values of this solution after 9 and 65 days at room temperature were found to be as follows:

| | pH | 2.5 | 5.0 | 7.5 | 10.0 | 12.5 | 15.0 | 20.0 | 25.0 | 30.0 |
|---|---|---|---|---|---|---|---|---|---|---|
| | | | | | RAN, 1 ml. 0.1N HCl per 3.0 ml. at ___ minutes | | | | | |
| 9 ds., r.t. | 8.9 | 27.5 | 39.9 | 46.2 | 50.3 | 53.2 | 55.1 | 58.2 | 60.4 | 61.3 |
| 65 ds., r.t. | 8.7 | 19.0 | 26.3 | 32.2 | 35.6 | 38.5 | 41.0 | 45.0 | 47.5 | 49.6 |

EXAMPLE 18

An aqueous antacid solution (pH 9.25) having mole ratios of Al:sorbitol:meglumine of 1:0.833:0.333 was prepared as in Example 1 using 10.83 g. of 70 percent sorbitol solution, 8.33 ml. of 2M meglumine solution, 12.0 ml. of distilled water and 50.0 ml. of 1M aluminum isopropoxide in benzene, and diluting with distilled water to a total weight of 65 g. as in Example 15. The RAN values of this solution after 66 days at room temperature were found to be as follows:

| | pH | 2.5 | 5.0 | 7.5 | 10.0 | 12.5 | 15.0 | 20.0 | 25.0 | 30.0 |
|---|---|---|---|---|---|---|---|---|---|---|
| | | | | | RAN, 1 ml. 0.1N HCl per 3.0 ml. at ___ minutes | | | | | |
| 66 ds., r.t. | 8.6 | 24.6 | 29.8 | 33.9 | 37.0 | 39.6 | 41.8 | 45.4 | 47.8 | 49.9 |

EXAMPLE 19

Aqueous antacid solution (pH 9.08) having mole ratios of Al:sorbitol:meglumine of 1:0.833:0.25 was prepared as in Example 1 using 6.25 ml. of 2M meglumine solution, 10.83 g. of 70 percent sorbitol solution, 14.0 ml. of distilled water and 50.0 ml. of 1M aluminum isopropoxide in benzene, and diluting with distilled water to a total weight of 65 g. as in Example 15. The RAN values of this solution after 66 days at room temperature were found to be as follows:

| | | RAN, 1 ml. 0.1N HCl per 3.0 ml. at ___ minutes | | | | | | | |
|---|---|---|---|---|---|---|---|---|---|
| | pH | 2.5 | 5.0 | 7.5 | 10.0 | 12.5 | 15.0 | 20.0 | 25.0 | 30.0 |
| 66 ds., r.t. | 8.72 | 20.0 | 26.1 | 30.2 | 33.7 | 36.3 | 38.4 | 42.2 | 44.6 | 49.0 |

EXAMPLE 20

Aqueous antacid solution having mole ratios of Al:sorbitol:meglumine of 1:1.0:0.50 was prepared as in Example 1 using 200 ml. of 1M aluminum isopropoxide solution in benzene, 52 g. of 70 percent sorbitol, 50 ml. of 2M meglumine solution and 18 ml. of distilled water, and diluting with distilled water to a total weight of 260 g. after removal of the benzene and isopropyl alcohol. On analysis the percentages (wt./wt.) of aluminum as Al(OH)$_3$, sorbitol and meglumine were found to be 5.5, 14.2 and 7.58, respectively. The specific gravity of this solution at 25°C. was found to be 1.1084 g./ml. Its ANP and RAN after four months at room temperature were found to be as follows:

| | Total ANP ml. 0.1N HCl/ml. | RAN, 1 ml. 0.1N HCl per 3.0 ml. at ___ minutes | | | | | | | |
|---|---|---|---|---|---|---|---|---|---|
| | | 2.5 | 5.0 | 7.5 | 10.0 | 12.5 | 15.0 | 20.0 | 25.0 |
| 4 mos., r.t. | 26.6 | 29.2 | 35.4 | 36.6 | 39.0 | 40.8 | 42.4 | 44.8 | 47.0 |

EXAMPLE 21

Aqueous antacid solution having mole ratios of Al:sorbitol:meglumine of 1:1.0:0.333 was prepared as in Example 1 using 200 ml. of 1M aluminum isopropoxide solution in benzene, 52 g. of 70 percent sorbitol, 33.3 ml. of 2M meglumine solution and 34 ml. of distilled water, and diluting with distilled water to a total weight of 260 g. after removal of the benzene and isopropyl alcohol. On analysis the percentages (wt./wt.) of aluminum as Al(OH)$_3$, sorbitol and meglumine were found to be 5.7, 13.1 and 5.18, respectively. The specific gravity of this solution at 25°C. was found to be 1.1012 g./ml. Its ANP and RAN after 4 months at room temperature were found to be as follows:

| | Total ANP ml. 0.1N HCl/ml. | RAN, 1 ml. 0.1N HCl per 3.0 ml. at ___ minutes | | | | | | | |
|---|---|---|---|---|---|---|---|---|---|
| | | 2.5 | 5.0 | 7.5 | 10.0 | 12.5 | 15.0 | 20.0 | 25.0 |
| 4 mos., r.t. | 25.4 | 20.6 | 25.4 | 29.0 | 31.4 | 33.8 | 35.6 | 38.4 | 40.8 |

EXAMPLE 22

Aqueous antacid solution having mole ratios of Al:sorbitol:meglumine of 1:1.0:0.20 was prepared as in Example 1 using 200 ml. of 1M aluminum isopropoxide solution in benzene, 52 g. of 70 percent sorbitol, 20 ml. of 2M meglumine solution and 48 ml. of distilled water, and diluting with distilled water to a total weight of 260 g. after removal of the benzene and isopropyl alcohol. On analysis the percentages (wt./wt.) of aluminum as Al(OH)$_3$, sorbitol and meglumine were found to be 5.5, 13.7 and 3.11, respectively. The specific gravity of this solution at 25°C. was found to be 1.0944 g./ml. Its ANP and RAN after 4 months at room temperature were found to be as follows:

| | Total ANP ml. 0.1N HCl/ml. | RAN, 1 ml. 0.1N HCl per 3.0 ml. at ___ minutes | | | | | | | |
|---|---|---|---|---|---|---|---|---|---|
| | | 2.5 | 5.0 | 7.5 | 10.0 | 12.5 | 15.0 | 20.0 | 25.0 |
| 4 mos., r.t. | 26.2 | 15.4 | 20.0 | 23.6 | 26.4 | 29.2 | 31.6 | 34.6 | 37.8 |

EXAMPLE 23

Aqueous antacid solution having mole ratios of Al:sorbitol:meglumine of 1:1.50:0.20 was prepared as in Example 1 using 100 ml. of 1M aluminum isopropoxide in benzene, 39.0 g. of 70 percent sorbitol solution, 10 ml. of 2M meglumine solution and 10 ml. of distilled water, and diluting with distilled water to a total weight of 130 g. The RAN values of this solution after 1, 8, 16 and 106 days at room temperature were found to be as follows:

| | | RAN, 1 ml. 0.1N HCl per 3.0 ml. at ___ minutes | | | | | | | |
|---|---|---|---|---|---|---|---|---|---|
| | pH | 2.5 | 5.0 | 7.5 | 10.0 | 12.5 | 15.0 | 20.0 | 25.0 | 30.0 |
| 1 d., r.t. | 8.55 | 34.0 | 48.0 | 53.8 | 57.3 | 59.4 | 60.8 | 63.5 | 65.0 | 66.0 |
| 8 ds., r.t. | 8.5 | 25.3 | 36.0 | 43.6 | 49.0 | 52.5 | 55.2 | 59.2 | 61.6 | 63.2 |
| 16 ds., r.t. | — | 20.9 | 28.1 | 33.6 | 37.8 | 41.2 | 43.7 | 47.7 | 52.3 | 52.8 |
| 106 ds., r.t. | 8.4 | 14.8 | 19.5 | 22.6 | 25.6 | 28.3 | 30.6 | 34.4 | 37.3 | 39.7 |

EXAMPLE 24

Aqueous antacid solution having mole ratios of Al:sorbitol:meglumine of 1:2.0:0.20 was prepared as in Example 1 using 100 ml. of 1M aluminum isopropoxide solution in benzene, 52 g. of 70 percent sorbitol, 10 ml. of 2M meglumine solution and 10 ml. of distilled water, and diluting with distilled water to a total weight of 130 g. The RAN values of this solution after 1, 8 and 106 days at room temperature were found to be as follows:

| | | RAN, 1 ml. 0.1N HCl per 3.0 ml. at ___ minutes | | | | | | | |
|---|---|---|---|---|---|---|---|---|---|
| | pH | 2.5 | 5.0 | 7.5 | 10.0 | 12.5 | 15.0 | 20.0 | 25.0 | 30.0 |
| 1 d., r.t. | 8.7 | 37.3 | 48.2 | 54.1 | 57.6 | 60.1 | 61.9 | 64.2 | — | 67.0 |
| 8 ds., r.t. | 8.5 | 25.0 | 35.5 | 42.0 | 46.1 | 49.0 | 51.4 | 54.6 | 57.3 | 59.1 |
| 106 ds., r.t. | 8.29 | 14.6 | 18.8 | 22.2 | 24.9 | 27.4 | 29.3 | 32.8 | 35.7 | 38.1 |

The aqueous antacid solutions of Examples 25 through 28, each of which comprises the polymeric meglumine-sorbitol-aluminum hydroxide-magnesium hydroxide complex having the indicated mole ratios of Al:Mg:sorbitol:meglumine, were prepared following the procedure described in Example 2 using the appropriate quantities of ingredients as indicated.

EXAMPLE 25

Aqueous antacid solution (pH 9.75) having mole ratios of Al:Mg:sorbitol:meglumine of 1:0.40:1.50:0.20 was prepared as in Example 2 using 88.9 ml. of 1M Al 0.45M Mg isopropoxide solution in cyclohexane, 11.1 ml. of 1M Al isopropoxide solution in cyclohexane, 39.0 g. of 70 percent sorbitol solution, 10.0 ml. of 2M meglumine solution and 30 ml. of distilled water, and diluting with distilled water to a total weight of 168 g. after removal of the cyclohexane and isopropyl alcohol in vacuo.

EXAMPLE 26

Aqueous antacid solution (pH 9.75) having mole ratios of Al:Mg:sorbitol:meglumine of 1:0.30:1.50:0.20 was prepared as in Example 2 using 66.7 ml. of 1M Al 0.45M Mg isopropoxide solution in cyclohexane, 33.3 ml. of 1M Al isopropoxide solution in cyclohexane, 39.0 g. of 70 percent sorbitol solution, 10.0 ml. of 2M meglumine solution and 30 ml. of distilled water, and diluting with distilled water to a total weight of 168 g. after removal of the cyclohexane and isopropyl alcohol in vacuo.

EXAMPLE 27

Aqueous antacid solution (pH 9.12) having mole ratios of Al:Mg:sorbitol:meglumine of 1:0.10:1.33:0.20 was prepared as in Example 2 using 10 ml. of 0.5M magnesium aluminum isopropoxide in benzene, 40 ml. of 1M aluminum isopropoxide in benzene, 17.33 g. of 70 percent sorbitol solution, 5 ml. of 2M meglumine solution and 8 ml. of distilled water, and diluting with distilled water to a total weight of 65 g. after removal of the benzene and isopropyl alcohol in vacuo. A 28.15 g. portion of this aqueous antacid solution was diluted with distilled water to a total weight of 30 g. to produce a solution having a total acid neutralizing power equivalent to 6 percent aluminum hydroxide. The RAN of this solution after 173 days at room temperature was found to be as follows:

| | pH | 2.5 | 5.0 | 7.5 | 10.0 | 12.5 | 15.0 | 20.0 |
|---|---|---|---|---|---|---|---|---|
| | | | | | RAN, 1 ml. 0.1N HCl per 3.0 ml. at minutes | | | | |
| 173 ds., r.t. | 9.38 | 30.7 | 39.4 | 44.7 | 48.4 | 50.2 | 52.4 | 54.8 |

EXAMPLE 28

Aqueous antacid solution (pH 9.33) having mole ratios of Al:Mg:sorbitol:meglumine of 1:0.20:1.33:0.20 was prepared as in Example 2 using 20 ml. of 0.5M magnesium aluminum isopropoxide in benzene, 30 ml. of 1M aluminum isopropoxide in benzene, 17.33 g. of 70 percent sorbitol solution, 5 ml. of 2M meglumine solution and 8 ml. of distilled water, and diluting with water to a total weight of 65 g. after removal of the benzene and isopropyl alcohol in vacuo. A 26.5 g. portion of this aqueous antacid solution was diluted with distilled water to a total weight of 30 g. to produce a solution having a total acid neutralizing power equivalent to 6 percent of aluminum hydroxide. The RAN of this solution after 173 days at room temperature was found to be as follows:

| | pH | 2.5 | 5.0 | 7.5 | 10.0 | 12.5 | 15.0 | 20.0 |
|---|---|---|---|---|---|---|---|---|
| | | | | | RAN, 1 ml. 0.1N HCl per 3.0 ml. at minutes | | | | |
| 173 ds., r.t. | 9.53 | 43.0 | 50.7 | 54.7 | 57.2 | 59.3 | 60.4 | 62.4 |

EXAMPLE 29

Aqueous antacid solution comprising polymeric meglumine-sorbitol-aluminum hydroxide-magnesium hydroxide complex having the same mole ratios of ingredients as the solution of Example 3 was prepared following the procedure of Example 3. Its pH was 9.2 and its analysis was as follows:

| | Calculated %, wt./vol. | Found % wt./vol. |
|---|---|---|
| aluminum as Al(OH)₃ | 4.5 | 4.57 |
| total magnesium as Mg(OH)₂ | 1.5 | 1.49 |
| meglumine | 2.25 | 2.24 |
| sorbitol | 15.8 | 15.5 |
| gluconic acid | 3.4 | 3.2 |

The total acid neutralizing power (ANP) and rate of acid neutralization (RAN) of this solution after one month at 5°, 25° and 50°C., and three months at 25° and 50°C. are given as follows:

| | pH | Total ANP ml. 0.1N HCl/ml. | 2.5 | 5.0 | 7.5 | 10.0 | 12.5 | 15.0 |
|---|---|---|---|---|---|---|---|---|
| | | | | RAN, 1 ml. 0.1N HCl per 3.0 ml. at minutes | | | | | |
| 1 mo., 5°C. | 9.2 | 24.8 | 50.4 | 53.6 | 55.2 | 56.2 | 57.0 | 57.4 |
| 1 mo., 25°C. | 9.2 | 24.8 | 47.8 | 51.6 | 53.2 | 54.4 | 55.0 | 55.6 |
| 1 mo., 50°C. | 9.1 | 24.0 | 30.8 | 39.4 | 43.2 | 45.0 | 46.0 | 47.0 |
| 3 mos., 25°C. | 9.2 | 24.4 | 42.8 | 47.6 | 49.6 | 50.8 | 51.6 | 52.2 |
| 3 mos., 50°C. | 9.2 | 23.6 | 23.6 | 32.6 | 37.4 | 40.6 | 42.8 | 44.0 |

EXAMPLE 30

Aqueous antacid solution comprising polymeric meglumine-sorbitol-aluminum hydroxide complex having the same mole ratios of ingredients as the solution of Example 1 is prepared following the procedure of Example 1 using aluminum n-propoxide in place of aluminum isopropoxide.

EXAMPLE 31

Aqueous antacid solution comprising polymeric meglumine-sorbitol-aluminum hydroxide complex having mole ratios of Al:sorbitol:meglumine of 1:0.50:0.40 is prepared following the procedure described in Example 1 using corresponding molar equivalent quantities of the reactants.

EXAMPLE 32

Aqueous antacid solution comprising polymeric meglumine-sorbitol-aluminum hydroxide having mole ratios of Al:sorbitol:meglumine of 1:0.333:0.40 is prepared following the procedure described in Example 1 using twice as much meglumine and one-fourth as much sorbitol as in Example 1.

EXAMPLE 33

A solution like that of Example 2 was prepared using the procedure of Example 2 but using aluminum magnesium n-propoxide in place of aluminum magnesium isopropoxide as the source of magnesium. The following ingredients were used per 500 ml. of solution: 288 ml. of 1.0M Al 0.45M magnesium propoxide ("propoxide" as used here is generic to n-propoxide and isopropoxide since it was prepared from aluminum magnesium n-propoxide and aluminum isopropoxide by the procedure given hereinbelow) solution in cyclohexane, 112.5 g. of sorbitol solution, 11.3 g. of meglumine and 160 ml. of distilled water. There was thus obtained a solution (pH 9.7) comprising polymeric meglumine-sorbitol-aluminum hydroxide-magnesium hydroxide complex having mole ratios of Al:Mg:sorbitol:meglumine of 1:0.45:1.50:0.20. The total acid neutralizing power (ANP) and rate of acid neutralization (RAN) of this solution was found to be as follows:

| Total ANP ml. 0.1N HCl/ml. | RAN, 1 ml. 0.1N HCl per 3.0 ml. at minutes | | | | | | |
|---|---|---|---|---|---|---|---|
| | 2.5 | 5.0 | 7.5 | 10.0 | 12.5 | 15.0 | 20.0 |
| 22.8 | 63.2 | 65.8 | 66.4 | 66.8 | 67.0 | 67.0 | 67.0 |

The above intermediate 1.0M 0.45M Mg propoxide solution in cyclohexane was prepared by mixing 315 ml. of 1.0M Al 0.5M Mg n-propoxide solution in cyclohexane (preparation given in following paragraph), 25 ml. of 1.4M Al isopropoxide solution in cyclohexane and enough cyclohexane to bring the total volume to 350 ml.

Said 1.0M Al 0.5M Mg n-propoxide solution in cyclohexane was prepared as follows: Under anhydrous conditions a mixture containing 100 ml. of n-propanol and 5 g. of purified aluminum metal (8–20 mesh) with 4 g. of magnesium aluminum isopropoxide as catalyst was heated with stirring to reflux the alcohol. After the reaction had started in about 5 to 10 minutes, heating was reduced while maintaining a slow reflux. After about 30 minutes of refluxing with stirring, a further 22 g. portion of aluminum metal (8–20 mesh), 12.16 g. of magnesium metal turnings, and another 100 ml. portion of n-propanol was added; and, heating was increased to bring the alcohol to reflux. After the exothermic reaction had started, external heating was stopped. After about fifteen minutes of refluxing, a further 200 ml. portion of n-propanol was added and the stirred reaction mixture was heated to produce a gentle reflux. After three hours of refluxing, practically all of the metal had reacted. The refluxing was continued for another 2 hours. The reaction mixture was then distilled and about 70 ml. of distillate was collected, the temperature of the reaction mixture rising from about 135°C. at the start of distillation to about 165°C. To the remaining material was added 500 ml. of cyclohexane and the solution was allowed to cool. When the solution had started to gel on cooling, 45 ml. of n-propanol was added. Additional cyclohexane was added to give a volume of about 900–950 ml. The solution was treated with dry infusorial earth and decolorizing charcoal, and the mixture filtered. The filter pad was washed with cyclohexane. The combined filtrate and washings were brought to a volume of one liter by adding cyclohexane. On assay this solution was found to contain 1.00M Al and 0.50M Mg which were the same as the calculated values.

EXAMPLE 34

A solution like that of Example 3 was prepared using the procedure of Example 3 but using aluminum magnesium n-propoxide in place of aluminum magnesium isopropoxide as the source of magnesium. The following ingredients were used per 500 ml. of solution: 288 ml. of 1.0M Al 0.3M Mg propoxide solution in cyclohexane (preparation of this solution of a mixture of n-propoxide and isopropoxide is given hereinbelow), 112.5 g. of sorbitol solution, 11.3 g. of meglumine, 130 ml. of water, and 18.0 g. of magnesium gluconate in 72 ml. of water. There was thus obtained a solution (pH 9.48) comprising polymeric meglumine-sorbitol-aluminum hydroxide-magnesium hydroxide complex having mole ratios of Al:Mg:sorbitol:meglumine of 1:0.30:1.50:0.20 and also 0.15 mole of magnesium gluconate per mole of Al. The total ANP and RAN of this solution were found to be as follows:

| Total ANP ml. 0.1N HCl/ml. | RAN, 1 ml. 0.1N HCl per 3.0 ml. at minutes | | | | | | |
|---|---|---|---|---|---|---|---|
| | 2.5 | 5.0 | 7.5 | 10.0 | 12.5 | 15.0 | 20.0 |
| 23.2 | 55.4 | 56.8 | 57.6 | 58.0 | 58.4 | 58.6 | 58.6 |

The above intermediate 1.0M Al 0.3M Mg propoxide solution in cyclohexane was prepared by mixing 210 ml. of 1.0M Al 0.5M Mg n-propoxide solution in cyclohexane (preparation given above in Example 33) and 100 ml. of 1.4M Al isopropoxide solution in cyclohexane, and adding enough cyclohexane to bring the volume to 350 ml.

Satisfactory solutions were obtained when the above solutions were further diluted with distilled water, e.g., when a given volume of each solution of Example 1, 2 or 3 is mixed well with an equal volume of distilled water, said diluted solutions have about 12 to 14 percent by weight per volume of the respective complex.

COMPARATIVE INTRAGASTRIC BUFFERING EFFECTS IN THE ALERT DOG

The aqueous antacid solution of the instant invention when compared with a commercial antacid suspension was found to produce a better antacid effect when administered to alert dogs with normal secretory activity. This comparative study was done by comparing the buffering effects of equal volumes of applicant's aqueous antacid solution of Example 3 (hereinafter designated as A's Ex. 3) and a commercial aluminum hydroxide-magnesium hydroxide suspension containing about 4 percent each of aluminum hydroxide and magnesium hydroxide and about 1 percent of sorbitol (hereinafter designated as Com. Susp. No. 1) in unanesthetized mongrel dogs with normal secretory activity. Details and results of this study are presented hereinbelow.

Preparation of Animals

Five normal male mongrel dogs (12–20 kg.) were used in this experiment. Each animal had an endotracheal cannula inserted under routine aseptic conditions and using barbital sodium anesthesia. Then, under surgical anesthesia, a stainless steel Thomas cannula was inserted such that the greater gastric curvature was made accessible to the exterior by means of the cannula. After recovery from the operative procedure, the animal was trained to stand in a Pavlov frame for 3 to 4 hours and permit the insertion of tubes and other appurtenances into the gastric cavity, and was psychologically prepared to accept and tolerate the technical team without untoward effects on the secretory physiology of the stomach. Prepared animals were restricted from inclusion in the study if the basal intragastric pH was not less than 3.0, if the intragastric pH did not rise to at least 3.0 after the administration of antacid, or if the intragastric pH remained above 3.5 for more than 60 minutes after administration of the antacid. These instances are believed to represent technical difficulties rather than reflecting normal physiological intragastric responses.

Technique for Testing

Each dog was fasted for 24 hours (water ad. lib.) before the start of testing. The animal was then placed in a Pavlov frame and a naso-gastric tube was inserted into the dependent portion of the stomach via the Thomas cannula. The stomach contents were evacuated and retained to constitute the basal gastric analysis data. The animals were permitted to control their salivary secretions in a normal physiological manner. A pH electrode was inserted into the gastric vault via the Thomas cannula and readings were noted at five minute intervals. Samples of gastric juice were aspirated at 5 minute intervals and measured as to volume, pH, and total acid (assessed by titrimetric means using 1.0 N NaOH and a phenol red indicator). The basal studies were continued for 30 minutes with pH less than 3.0 for at least three consecutive 5 minute periods. Fifteen mls. of the antacid were then introduced into the stomach though the naso-gastric tube which was flushed with air equal in volume to the dead space of the tube. The intragastric pH was noted and a 3 ml. sample of gastric juice was obtained at 2 minute intervals for 10 minutes. One ml. of the fluid was retained for analysis and the remainder returned to the gastric vault using an air flush. Thereafter, at 5 minute intervals, similar studies were carried out until the intragastric pH returned to the basal level but in any event was less than 3.0. A 30 minute basal period then ensued wherein the gastric contents were evacuated every 5 minutes, measured, and analyzed as previously outlined. The experiment was then repeated exactly using the second antacid.

A's Ex. 3 (A) and Com. Susp. No. 1 (CS) were administered to each of the five test dogs in the following order: A-CS-CS-A.

The data obtained in this study are presented in Table I. These data indicate that A's Ex. 3 produced a more intense, more prolonged and more consistent antacid effect than Com. Susp. No. 1 when administered to alert dogs with normal secretory activity.

Table I

Intragastric Effects of A's Ex. 3 and Com. Susp. No. 1 in the Alert Dog

A's Ex. 3"

| Dog/Test No. | Area[b] | Time pH Over 3.5 (Minutes) | Peak pH |
|---|---|---|---|
| 1A | 1.27 | 52 | 7.2 |
| 1D | 1.37 | 34 | 6.4 |
| 2A | 3.11 | 44 | 7.4 |
| 2D | 1.83 | 40 | 7.6 |
| 3A | 2.43 | 48 | 7.5 |
| 3D | 2.67 | 49 | 8.0 |
| 4A | 4.77 | 76 | 6.8 |
| 4D | 4.30 | 71 | 6.5 |
| 5A | 2.04 | 48 | 6.6 |
| 5D | 2.18 | 45 | 6.5 |
| | 2.60 | 50.7 | 7.05 |

Com. Susp. No. 1"

| Dog/Test No. | Area[b] | Time pH Over 3.5 (Minutes) | Peak pH |
|---|---|---|---|
| 1B | 0.44 | 14 | 6.8 |
| 1C | 0.76 | 29 | 6.4 |
| 2B | 0.71 | 29 | 6.8 |
| 2C | 0.80 | 24 | 6.5 |
| 3B | 1.12 | 28 | 6.5 |
| 3C | 1.02 | 29 | 6.3 |
| 4B | 1.20 | 33 | 6.1 |
| 4C | 0.80 | 24 | 6.5 |
| 5B | 1.36 | 33 | 5.9 |
| 5C | 1.55 | 44 | 6.2 |
| | 0.98 | 28.7 | 6.40 |

"A standard 15 ml. dose was used at all times.
[b]Area (in arbitrary units) under the curve described by plotting intragastric pH above 3.5 versus time in minutes.

COMPARATIVE ANTACID AND ANTIULCER ACTIVITIES IN RATS

The aqueous antacid solution of the invention was found to inhibit significantly gastric ulceration in reserpinized rats and, in fact, preferred embodiments were found to be more active than either of two commercial antacid suspensions in protecting rats from reserpine-induced ulcers. In this study applicant's aqueous antacid solutions of Examples 1, 10, 11, 12 and 13 (hereinafter designated, respectively, as A's Ex. 1, A's Ex. 10, A's Ex. 11, A's Ex. 12 and A's Ex. 13) were compared with one commercial aluminum hydroxide-magnesium hydroxide antacid suspension containing about 4 percent each of aluminum hydroxide and magnesium hydroxide and about 1 percent sorbitol (hereinafter designated as Com. Susp. No. 1) and a second commercial antacid alumina gel containing 6 percent aluminum hydroxide (hereinafter designated as Com. Susp. No. 2). This study was carried out as follows:

Method

Male, Sprague-Dawley albino rats weighing approximately 300 g. were fasted 48 hours with water supplied ad libitum. Then, the rats, in groups of seven, were medicated orally with the above said antacids in a volume of 1.5 ml./kg. hourly for 6 hours (6x in 6 hours). A control group of 10 rats received a volume of 1.5 ml./kg. of distilled water in the same manner. All antacids were diluted to a 1:2 concentration with distilled water prior to intubation. Immediately following the first medication, the control rats and all medicated rats were injected intramuscularly with 5.0 mg./kg. of reserpine in a volume of 1.0 ml./kg. to induce ulcers. At the end of the 6 hour period, the rats were sacrificed, and the stomachs were removed, opened along the greater curvature, and examined for number and size of ulcers. An ulcer index was determined for each rat according to the size and number of ulcers per rat.

| Size of Ulcer | Value of Ulcer |
|---|---|
| $<1^2$ mm | = 1 (small) |
| $1^2$ mm — $2.9^2$ mm | = 2 (medium) |
| $\geq 3^2$ mm | = 5 (large) |

The number of ulcers of each size in each stomach was multiplied by its respective value. The total value for all rats in each group was divided by the number of rats per group for an average ulcer score. The mean ulcer indices of the medicated and control rats were compared and expressed as percent inhibition of ulceration.

Results

Table II shows the effect of the tested antacids on the number and size of ulcers in comparison with the control rats. Applicant's aqueous antacid solutions containing aluminum hydroxide and magnesium hydroxide, either with (A's Ex. No. 13) or without (A's Ex. No. 11 and A's Ex. No. 12) the addition of magnesium gluconate, significantly inhibit gastric ulceration in rats. Applicant's aqueous antacid solutions containing aluminum hydroxide with no magnesium hydroxide (A's Ex. No. 1 and A's Ex. No. 10) inhibit gastric ulceration to a greater degree than the two commercial antacid suspensions.

FURTHER COMPARATIVE ANTACID AND ANTIULCER ACTIVITIES IN RATS

The aqueous antacid solution of Example 1 (A's Ex. 1) was found to provide greater protection against ulcers in the non-ligated reserpinized rat than five commercial aluminum hydroxide or aluminum hydroxide-magnesium hydroxide suspensions, namely, the above-noted Com. Susp. No. 1 and Com. Susp. No. 2 and the following three commercial suspensions: an aluminum hydroxide gel (about 5 percent aluminum hydroxide) stabilized with sorbitol and containing about 1.5 percent magnesium hydroxide (hereinafter designated as Com. Susp. No. 3); an aluminum hydroxide gel (about 3.6 percent aluminum hydroxide) stabilized with sorbitol and containing about 2.8 percent magnesium hydroxide (hereinafter designated as Com. Susp. No. 4); and, a suspension containing about 4.7 percent aluminum hydroxide and 3.4 percent magnesium hydroxide (hereinafter designated as Com. Susp. No. 5).

Method

The test method was essentially like that already described hereinabove except that the rats were used in groups of eight. Two experiments were run in order to: (1) determine comparative ulcer protection of A's Ex. 1, Com. Susp. No. 3 and Com. Susp. No. 2; and (2) determine comparative ulcer protection of A's Ex. 1, Com. Susp. No. 4, Com. Susp. No. 1 and Com. Susp. No. 5.

Results

Table III shows that A's Ex. 1, Com. Susp. No. 3 and Com. Susp. No. 2 when administered at a 1:2 dilution provided effective protection against reserpine-induced gastric ulcers. A's Ex. 1 provided better protection (94 percent) than did Com. Susp. No. 3 (60 percent) and Com. Susp. No. 2 (68 percent). Seven of the eight control rats had a total of 57 ulcers, whereas only two of the eight rats receiving A's Ex. 1 had a total of four ulcers. Five of the eight rats receiving either Com. Susp. No. 3 or Com. Susp. No. 2 had a total of 19 ulcers each. The ulcer score, which was indicative of both the total number of ulcers and the size of the ulcer, was 8.8, 0.5, 3.5 and 2.8 for the control, A's Ex. 1, Com. Susp. No. 3 and Com. Susp. No. 2 groups respectively.

Table II

EFFECT OF ANTACIDS ON ULCERS INDUCED IN RATS BY RESERPINE

| Antacid | Sml. | Size of Ulcers Med. | Lg. | Total | No. Ulcerated Rats | Av. No. Ulcers/Rat | Ulcer Score | % Inhib. |
|---|---|---|---|---|---|---|---|---|
| Control | 57 | 10 | 0 | 67 | 9/10 | 6.7 | 7.7 | — |
| A's Ex. 11 | 6 | 0 | 0 | 6 | 3/7 | 0.9 | 0.9 | 88[c] |
| A's Ex. 10 | 18 | 0 | 0 | 18 | 5/7 | 2.6 | 2.6 | 66 |
| A's Ex. 1[a] | 28 | 0 | 0 | 28 | 6/7 | 4.0 | 4.0 | 48 |
| A's Ex. 13 | 10 | 3 | 0 | 13 | 6/7 | 1.9 | 2.3 | 70[c] |
| A's Ex. 12[b] | 8 | 0 | 0 | 8 | 4/7 | 1.1 | 1.1 | 86[c] |
| Com. Susp. No.1 | 31 | 3 | 0 | 34 | 7/7 | 4.9 | 5.3 | 31 |
| Com. Susp. No.2 | 13 | 1 | 2 | 16 | 6/7 | 2.3 | 3.6 | 53 |

[a]After extended storage at room temperature.
[b]After extended storage at room temperature.
[c]Students "t" test; significance between means; $P \leq 0.05$.

Table III

Effect of Antacids on Ulceration in Non-Ligated Rats

| Antacid | Dilution | Total No. of Ulcers | No. ulcerated Rats | Av. No. Ulcers/ Rat | Ulcer Score | % Inhib. |
|---|---|---|---|---|---|---|
| Control | — | 57 | 7/8 | 7.1 | 8.8 | — |
| A's Ex. 1 | 1:2 | 4 | 2/8 | 0.5 | 0.5 | 94 |
| Com. Susp. No.3 | 1:2 | 19 | 5/8 | 2.4 | 3.5 | 60 |
| Com. Susp. No.2 | 1:2 | 19 | 5/8 | 2.4 | 2.8 | 68 |

Table IV which contains average data of two separate experiments run in duplicate, shows that 16 control rats developed a mean total of 137 ulcers with an ulcer score of 9.6. The same number of rats receiving A's Ex. 1 had only 44 ulcers and a score of 3.1 with a 68 percent inhibition. Rats in the Com. Susp. No. 4 and Com. Susp. No. 1 groups had a total of 88 and 83 ulcers with a score of 5.7 and 5.9 respectively. Com. Susp. No. 5 afforded no protection. Sixteen rats receiving Com. Susp. No. 5 had a total of 134 ulcers and an ulcer score of 10.1. Seven large ulcers were produced in the Com. Susp. No. 5 group, two in the Com. Susp. No. 1 group and none in the Com. Susp. No. 4, A's Ex. 1 and control groups.

Table IV

Effect of Antacids on Ulceration in Non-Ligated Rats (Average of Two Tests)

| Antacid | Dilution | Total No. of Ulcers | No. ulcerated Rats | Av. No. Ulcers/ Rat | Ulcer Score | % Inhib. |
|---|---|---|---|---|---|---|
| Control | — | 137 | 15/16 | 9.1 | 9.6 | — |
| A's Ex. 1 | 1:2 | 44 | 11/16 | 3.6 | 3.1 | 68 |
| Com. Susp. No.4 | 1:2 | 88 | 13/16 | 6.8 | 5.7 | 41 |
| Com. Susp. No.1 | 1:2 | 83 | 14/16 | 5.9 | 5.9 | 39 |
| Com. Susp. No.5 | 1:2 | 134 | 13/16 | 10.3 | 10.1 | 0 |

In summary, these two experiments show that A's Ex. 1 produced greater protection against ulceration in the non-ligated reserpinized rat than Com. Susp. Nos. 1, 2, 3, 4 and 5.

TOXICOLOGICAL STUDIES

The following acute oral toxicological studies of applicant's aqueous antacid solutions, A's Ex. 1, A's Ex. 2 and A's Ex. 3, were carried out using standard toxicological test procedures in mice and rats using ten animals per each dose level tested, i.e., 10, 20 and 40 ml./kg.

A's Ex. 1

An acute oral toxicity determination was carried out in mice with A's Ex. 1 and was found to be >40 ml./kg. at 24 hours and 7 days. There were no deaths or untoward reactions at any of the three dose levels tested. On the seventh day after medication the mice appeared normal and had gained weight. Autopsy of some of these mice revealed no obvious tissue changes.

A's Ex. 2

Acute oral toxicity ($LD_{50}$) determinations were done with A's Ex. 2 in the mouse and rat. The $LD_{50}$ was >40 ml./kg. in both the mouse and rat at 7 days. No pharmacologic symptoms or signs of toxicity or deaths were observed at any dose level of A's Ex. 2 in either the mouse or rat. On the seventh day after medication the mice and rats appeared normal and had gained weight. Autopsy of a representative number revealed no gross tissue changes.

A's Ex. 3

Acute oral toxicity ($LD_{50}$) determinations were carried out with A's Ex. 3 and Com. Susp. No. 1 in the mouse and rat. The two samples were tested as a direct assay. The $LD_{50}$'s for both A's Ex. 3 (a solution) and for Com. Susp. No. 1 (a suspension) in the mouse and rat were >40 ml./kg. at 7 days. No pharmacologic symptoms or signs of toxicity were observed at any dose level of either A's Ex. 3 or Com. Susp. No. 1 in the mouse or rat. On the seventh day after medication the mice and rats appeared normal and had gained weight. Autopsy of a respresentative number of mice and rats revealed no macroscopic tissue changes.

PLASMA ALUMINUM AND MAGNESIUM CONCENTRATIONS IN RATS AFTER ADMINISTRATION OF ANTACIDS

These studies ascertained plasma aluminum and magnesium concentrations in rats after administration of the five antacids: A's Ex. 10, A's Ex. 11, A's Ex. 13, Com. Susp. No. 1 and Com. Susp. No. 2. The plasma levels of the actions were measured by atomic absorption spectrometry in rats given oral suspensions or solutions. Times of sampling were 2 and 5 hours. No significant change was seen in the levels of these substances relative to control animals receiving saline alone.

I claim:

1. A clear aqueous antacid solution having a pH from about 8.5 to 9.8 comprising water and an effective amount of a polymeric meglumine-hexitol-aluminum hydroxide complex which has mole ratios of Al:hexitol:meglumine of about 1:0.333–1.333:0.12–0.50 where hexitol is sorbitol or mannitol.

2. A clear aqueous antacid solution having a pH from about 8.5 to 9.8 comprising water and from about 12 to 45 percent by weight per volume of a polymeric meglumine-hexitol-aluminum hydroxide complex which has mole ratios of Al:hexitol:meglumine of about 1:0.333–1.333:0.12–0.50 where hexitol is sorbitol or mannitol.

3. The solution of claim 2 containing about 4.5 to 9.0 percent of aluminum as aluminum hydroxide, about 2.25 to 4.5 percent of meglumine and about 15 to 30 percent of sorbitol or mannitol, each percentage being as weight per volume.

4. The solution of claim 2 where said complex has mole ratios of Al:hexitol:meglumine of about 1:0.667–1.333:0.20–0.333.

5. The solution of claim 2 where up to about 27 percent by weight of the aluminum hydroxide is replaced by magnesium hydroxide.

6. The solution of claim 5 containing about 4.5 to 9.0 percent of aluminum as aluminum hydroxide, up to about 3.0 percent of magnesium as magnesium hydroxide, about 2.25 to 4.5 percent of meglumine and about 15 to 30 percent of sorbitol, each percentage being as weight per volume.

7. The solution of claim 6 containing up to about 7.0 percent weight per volume of magnesium gluconate.

8. The solution of claim 5 containing about 4.5 to 6.0 percent of aluminum as aluminum hydroxide, up to about 1.5 percent of magnesium as magnesium hydroxide, about 2.25 to 3.0 percent of meglumine and about 15 to 20 percent of sorbitol, each percentage being as weight per volume.

9. The solution of claim 8 containing up to about 3.5 percent weight per volume of magnesium gluconate.

10. The solution of claim 1 where sorbitol is the hexitol.

11. The solution of claim 1 where mannitol is the hexitol.

12. A process for preparing a clear aqueous antacid solution having a pH from about 8.5 to 9.8 comprising water and from about 12 to 45 percent by weight per volume of a polymeric meglumine-hexitol-aluminum hydroxide complex which has mole ratios of Al:hexitol:meglumine of about 1:0.333–1.333:0.12–0.50 where hexitol is sorbitol or mannitol, said process which comprises mixing aluminum tri-(lower-alkoxide), where lower-alkoxide has from two to five carbon atoms inclusive, in a non-polar solvent with an aqueous solution containing said mole ratio proportions of meglumine and sorbitol or mannitol, separating the aqueous phase from the non-polar phase of the mixture, heating the aqueous phase under reduced pressure at about 40–70°C. to remove residual non-polar solvent and the lower-alkanol produced by the reaction, and diluting the remaining aqueous solution with water to the desired concentration.

13. The process of claim 12 for the preparation of the solution thereof wherein up to about 27 percent by weight of the aluminum hydroxide is replaced by magnesium hydroxide where the calculated proportion of the aluminum tri-(lower-alkoxide) is replaced by magnesium di-(lower-alkoxide) or by magnesium di-aluminum octa-(lower-alkoxide) where lower-alkoxide has from two to five carbon atoms inclusive.

14. The process of claim 12 where lower-alkoxide is isopropoxide.

15. The process of claim 12 where lower-alkoxide is n-propoxide.

16. The process of claim 13 where lower-alkoxide in each instance is isopropoxide.

17. The process of claim 13 where lower-alkoxide in each instance is n-propoxide.

18. The process of claim 12 where hexitol is sorbitol.

19. The process of claim 12 where hexitol is mannitol.

20. The proces of claim 13 where hexitol is sorbitol.

* * * * *

UNITED STATES PATENT OFFICE
CERTIFICATE OF CORRECTION

PATENT NO. : 3,892,851
DATED : July 1, 1975
INVENTOR(S) : Emil T. Hinkel, Jr.

It is certified that error appears in the above-identified patent and that said Letters Patent are hereby corrected as shown below:

Column 1, line 2, "PLOYMERIC" should read -- POLYMERIC --.

Column 1, line 33, "1.333:0.-" should read -- 1.333:0.20- --, and on line 34 omit "20-".

Column 2, line 20, "1.333:0.-" should read --1.333:0.20- --, and on line 21 omit "20-".

Column 4, line 8, "37+C." should read -- 37°C. --.

Signed and Sealed this twenty-first Day of October 1975

[SEAL]

Attest:

RUTH C. MASON
Attesting Officer

C. MARSHALL DANN
Commissioner of Patents and Trademarks